US011144297B2

(12) United States Patent
De Atley et al.

(10) Patent No.: US 11,144,297 B2
(45) Date of Patent: Oct. 12, 2021

(54) SECURE DELIVERY OF ASSETS TO A TRUSTED DEVICE

(71) Applicant: Apple Inc., Cupertino, CA (US)

(72) Inventors: Dallas B. De Atley, San Francisco, CA (US); Bailey E. Basile, Cupertino, CA (US); Venkat V. Memula, Livermore, CA (US); Thomas P. Mensch, Sunnyvale, CA (US); Robert M. Marini, San Francisco, CA (US); David P. Remahl, Woodside, CA (US); Kelsey J. Skillman, Mountain View, CA (US); Edward E. Thomas, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 16/147,295

(22) Filed: Sep. 28, 2018

(65) Prior Publication Data

US 2019/0227784 A1    Jul. 25, 2019

Related U.S. Application Data

(60) Provisional application No. 62/620,450, filed on Jan. 22, 2018.

(51) Int. Cl.
*G06F 8/65* (2018.01)
*H04L 29/06* (2006.01)
*G06F 21/60* (2013.01)

(52) U.S. Cl.
CPC .............. *G06F 8/65* (2013.01); *G06F 21/602* (2013.01); *H04L 63/08* (2013.01)

(58) Field of Classification Search
CPC .......... G06F 8/65; G06F 21/57; G06F 21/602; H04L 63/08
USPC ........................................................ 713/191
See application file for complete search history.

(56) References Cited

U.S. PATENT DOCUMENTS

| | | | |
|---|---|---|---|
| 2011/0289499 A1 | 11/2011 | Haubold et al. | |
| 2015/0128126 A1 | 5/2015 | Brunet et al. | |
| 2015/0242198 A1* | 8/2015 | Tobolski | G06F 8/65 717/172 |
| 2015/0339113 A1* | 11/2015 | Dorman | H04W 4/60 717/169 |
| 2016/0037149 A1 | 2/2016 | Nishikawa | |
| 2016/0266889 A1 | 9/2016 | Gross et al. | |
| 2019/0250899 A1* | 8/2019 | Riedl | H04L 9/0841 |

* cited by examiner

*Primary Examiner* — Jacob Lipman
(74) *Attorney, Agent, or Firm* — Kilpatrick Townsend & Stockton LLP

(57) ABSTRACT

Embodiments described herein provide a system and method for secure delivery of assets to a trusted device. Multiple levels of verification are implemented to enable components of a software update and asset delivery system to verify other components within the system. Furthermore, updates are provided only to client devices that are authorized to receive such updates. In one embodiment, the specific assets provided to a client device during a software update can be tailored to the client device, such that individual client devices can receive updated versions of software asset at a faster or slower rate than mass market devices. For example, developer or beta tester devices can receive pre-release assets, while enterprise devices can receive updates at a slower rate relative to mass market devices.

24 Claims, 13 Drawing Sheets

SECURE DELIVERY OF ASSETS TO A TRUSTED DEVICE

CROSS-REFERENCE

This application also claims priority to U.S. Provisional Patent Application Ser. No. 62/620,450 filed on Jan. 22, 2018, which is hereby incorporated herein by reference.

TECHNICAL FIELD

This disclosure relates generally to the delivery of software update assets to a client device. More specifically, this disclosure relates to the secure delivery of assets to a trusted device.

BACKGROUND OF THE DISCLOSURE

Electronic devices can receive software updates via an update deployment system established over a wide area network, such as the Internet. Software updates can be deployed for system software as well as for applications executable on the electronic device. As the update deployment system may be exposed to attack via the internet, it may be beneficial to secure the update system from malicious attack. Additionally, update systems may be susceptible to insider attacks by a person with authorized system access. Accordingly, software update systems may benefit from multiple levels of security when deploying assets associated with software updates.

SUMMARY OF THE DESCRIPTION

Embodiments described herein provide a system and method for secure delivery of assets to a trusted device. Multiple levels of verification are implemented to enable components of a software update and asset delivery system to verify other components within the system. Furthermore, updates are provided only to client devices that are authorized to receive such updates.

One embodiment provides for a system for managing a software update for an electronic device, the system comprising a first server device coupled to a network, the first server device to host a registry of assets associated with the software update for the electronic device; a second server device to build an asset for the electronic device and register the asset with the first server device; and a client device to send an asset request to the first server device, the asset request including a cryptographic identifier of the client device, wherein, in response to the asset request, the first server device is to verify the cryptographic identifier of the client device and provide a signed response to the client device, the signed response including a storage location for the asset, and wherein the client device, after authentication of the signed response, is to retrieve the asset from the storage location.

One embodiment provides for a method of managing a software update for an electronic device, the method comprising building an asset associated with a software update for an electronic device; creating an asset receipt for the asset associated with the software update, the asset receipt to attest to validity of the asset; registering the asset with an asset server, the asset server to host a registry of assets associated with the software update, wherein registering the asset with the asset server includes providing a signed version of the asset receipt to the asset server; and uploading the asset to a location on a content server, wherein the electronic device is to query the asset server for the software update and the asset server is to provide a signed response and the signed version of the asset receipt to the electronic device upon verification of authenticity of the electronic device.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1:
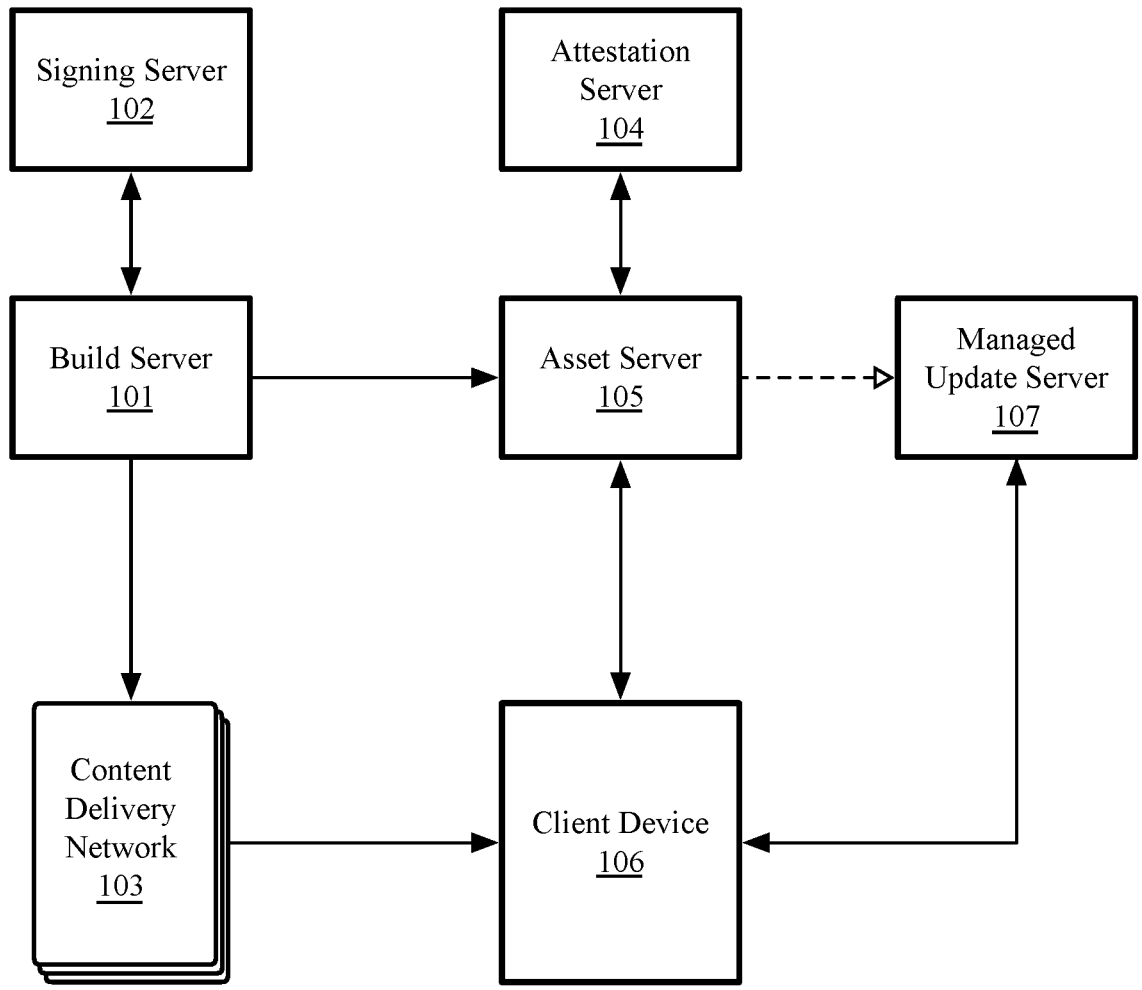
FIG. 1 is a block diagram of a secure software update system, according to an embodiment described herein.

As described herein, a software update for a client device can comprise multiple individual software assets that make up the various components of a system image or update image for a client device. For example, an update to an operating system of a client device can include software assets for each of the various components of the operating system. The various software assets associated with a given update can be listed in an update catalog that enumerates the individual assets and asset versions of the software update. Embodiments described herein provide a system and method for facilitate secure delivery of the various assets of a software update and to limit the availability of those assets only to trusted devices that are authorized to execute assets associated with the software update.

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment. An element having a reference number between 100 and 199 is first shown in FIG. 1, while an element having a reference number between 200 and 299 is first shown in FIG. 2, etc. Within a description of a given figure, previously introduced elements may or may not be referenced.

As described herein multiple levels of verification are implemented to enable components of a software update and asset delivery system to verify other components within the system. Previous software update systems relied upon on-device logic to manage and acquire software updates for a client device. Instead of using on-device update logic, embodiments described herein provide a server-based system for managing software updates. Secure software updates are facilitated via server-based cryptographic signing asset receipts and server-based management of software updates via software asset registration.

During a software update, a client device can download a list of software assets associated with the update according to catalogs provided by an asset server. In one embodiment, asset catalogs are provided only to client devices that are authorized to receive software updates. For example, a device manufacturer can determine whether a communicating device is a legitimate device from that manufacturer, rather than an unauthorized duplicate or counterfeit device.

Additionally, the assets specified by a catalog for a software update can be tuned for individual devices to enable specific devices to download specific versions of an assets that are tailed for the specific client device. Specific devices can be enrolled on specific update tracks, such that those devices will automatically receive development versions of specific assets, even of other, unrelated assets are production versions.

Some embodiment described herein enable managed software updated for enterprise client devices. A device can be enrolled in a specific enterprise update program in which software updates are delayed according to an update policy established in coordination between the device vendor and technology personnel associated with the multiple enterprises that are enrolled in the enterprise managed software update system. The managed software update system can restrict visibility of certain software updates or assets associated with those software updates until the internal software system of an enterprise is prepared for internal devices to receive such updates.

Furthermore, the managed update system can be used to gate installation of assets or software updates acquired via alternate mechanisms than the standard update system. For example, a client device can be configured to communicate with a managed update server to determine if an otherwise legitimate software update may be installed on the client device. The managed update server can indicate that the software update is not to be installed if enterprise update policies indicate that managed devices are not yet ready for a specific update.

Secure Update System

FIG. 1 is a block diagram of a secure software update system 100, according to an embodiment as described herein. FIG. 1 provides an overview of components of the secure software update system 100, while FIG. 2A-2C describe various sub-systems in greater detail.

The secure update system 100 includes a set of server devices that are interconnected via one or more networks. The one or more networks that interconnect the server devices can include local networks, such as corporate or datacenter networks, and can also include wide-area networks, such as the Internet. In one embodiment, the software update system 100 includes a build server 101, an asset server 105. One embodiment additionally includes a managed update server 107. A further embodiment additionally includes a signing server 102 and attestation server 104, which respectively cooperate with and facilitate operations of the build server 101 and the asset server 105. Embodiments described herein can additionally include server devices associated with a content delivery network 103. Each server described herein can be an individual server device, a virtual server, or a virtual server system hosted on a cluster of server devices.

A subset of the server devices described herein can interact with a client device 106. The illustrated client device 106 represents one or more of a plurality of client devices that can connect with the secure software update system 100 to acquire assets associated with a software update to be performed by the client device 106. The secure update system 100, in one embodiment, may be expected to service potentially millions of individual instances of the client device 106. Each client device 106 described herein can be one of various types of electronic devices, including but not limited to mobile electronic devices such as smartphones, table computers, and wearable electronic devices. In one embodiment, a client device 106 can also include a portable computing device, such as a laptop computing device. In one embodiment, the client device 106 can be a desktop computing device. In one embodiment, a client device 106 can be one of a variety of other electronic devices, including cellular telephones, personal digital assistants (PDAs), including cellular-enabled PDAs, network connected television set top boxes, or entertainment systems, including electronic gaming systems. The client device 106 can also be or integrated into other consumer electronic devices, such as smart appliance devices, or one or more implementations of a smart media playback device, such as a smart speaker device. The client device 106 can also be a network connected smart home device, such as a smart thermostat, lighting system, garage door opener, or other smart home devices.

As shown in FIG. 1, the build server 101 can be configured to compile software code associated with software assets and package the compiled software code into installable software assets. The collective packaged software assets can be further packaged into a larger software update for a client device. A software update package for a client device can include update packages for the various components of software executing on a client device, such as user interface modules, hardware drivers, and various frameworks and libraries used by system software and application software that can execute on a client device. The build server 101 can build each of these assets and register new versions of those assets with the asset server 105.

In one embodiment, the assets built by the build server 101 can be stored to a content delivery network 103. The content delivery network 103 a system of networked and distributed servers that can be used to deliver software and other content to users and/or client devices. The content delivery network 103 can reduce the latency of content delivery via the use of various cache servers that are geographically distributed. The cache servers replicate data stored to an origin server. When asset data is requested from a content delivery network 103, the asset data can be delivered from one of multiple servers based on the geographic location of the client device.

Storage location and version information for an asset that is built by the build server 101 can be provided to the asset server 105 during an asset registration process. Based on the provided registration data, the asset server 105 can maintain a catalog of various production and development versions of assets. During development of a software update, functionality and compatibility of the various assets can be tested and validated by software development and validation personnel. Various software updates that include development and production version of assets can be cataloged on the asset server 105.

In one embodiment, the build server 101 also generates a receipt for each asset that is registered along with the asset at the asset server 105. The receipt can include descriptive information for the asset and can be signed as a method of attesting to the authenticity of the asset, where an authentic asset is an asset that is built by and associated with the vendor or software provider of the client device 106. In one embodiment, the build server 101 can use a signing server 102 to sign the asset receipt. The signed asset receipt can then be registered with the asset at the asset server 105.

In one embodiment, the asset server 105 provides a registry of live assets that are available to a client device 106. To perform a software update, the client device 106 can send an asset request to the asset server 105. The asset server 105 can provide a response to the client device that includes catalog data that tells the client device 106 how to acquire the asset. Before catalog information allowing acquisition of an asset is provided to the client device 106, the asset server 105 can verify that the client device 106 is an authentic device. For example, a client device 106 is an authentic device if the device was manufactured by and registered with the device vendor of the client device. The client device 106 can include one or more hardware reference keys that are derived from and/or stored within hardware of the client device 106. The hardware reference key can be provided to the asset server 105, which can verify the legitimacy of the hardware reference key, and thus, verify the legitimacy of the client device 106.

In one embodiment, the attestation server 104 can be used to attest to the validity of the client device 106. The asset server 105 can provide the one or more hardware reference keys, as well as other identifying data for the client device 106 to the attestation server 104. The attestation server 104 can then determine the authenticity of the client device 106. For example, unauthorized and/or counterfeit versions of the client device may not have a hardware reference key that conforms to the proper cryptographic technique used to validate client devices 106. In addition to key verification, in one embodiment the attestation server 104 can query a device registry of client devices to determine if the client device 106, and/or associated keys or identifiers of the client device, were registered to the device registry by the hardware vendor. After the asset server 105 determines the client device 106 to be valid, a catalog can be provided to the client device 106 that includes a download location and a signed asset receipt for a requested asset. Determining the validity of the client device 106 before providing catalog information enables the list and location of assets to be provided only to authorized client devices, rather than storing the catalog information to a well-known network location that may be accessible to third-parties.

In one embodiment, the asset server 105 can provide customized assets to specific instances of the client device 106. Based on a device identifier or hardware reference key associated with a given device, specific versions of specific assets can be provided to the client device 106. A specific device can be identified as a development device that will receive the latest available development version of an asset, even if such asset will not be included in production versions of software updates.

In one embodiment, the asset server 105 can work in concert with a managed update server to enable managed updates for enterprise client devices. For example, the client device 106 can be enrolled in an enterprise update program in which software updates are delayed according to an enterprise update policy. Multiple enterprises can be enrolled in the enterprise managed software update system. Devices associated with those enterprises can registered with the secure software update system 100 using one or more of various device registration techniques. For example, specific devices associated with a specific enterprise can be enumerated based on a list or range of device identifiers. Alternatively, enterprise devices can be provisioned with certificates or profiles that associated the device with a specific enterprise managed software update program.

The specific update schedule for devices associated with a given enterprise managed software update system can be established and managed in coordination between the device vendor and technology personnel associated with the enterprise. During a delay period, the managed update server 107 can work in concert with the asset server to restrict visibility of certain software updates or assets associated with those software updates until the update is allowed by the enterprise. For example, updates can be delayed until the internal software system of an enterprise is updated to support internal devices having the latest available update.

Furthermore, the managed update server 107 can be used to gate installation of assets or software updates acquired via alternate mechanisms than the standard update system. For example, a client device 106 can be configured to communicate with the managed update server 107 to determine if an otherwise legitimate software update may be installed on the client device. The managed update server can indicate that the software update is not to be installed if enterprise update policies indicate that managed devices are not yet ready for a specific update.

Once a client device 106 receives a catalog for an asset, the client device can determine the validity of the asset by verifying the signed asset receipt associated with the asset. The signed asset receipt is generated by the build server 101 and attests to the source of the asset. Verifying the signed asset receipt provides a degree of assurance to the client device 106 that the asset is a genuine asset that is built by the build server 101, or otherwise provided by a legitimate software vendor.

Secure Update Sub-Systems and Methods

Figure 2A:
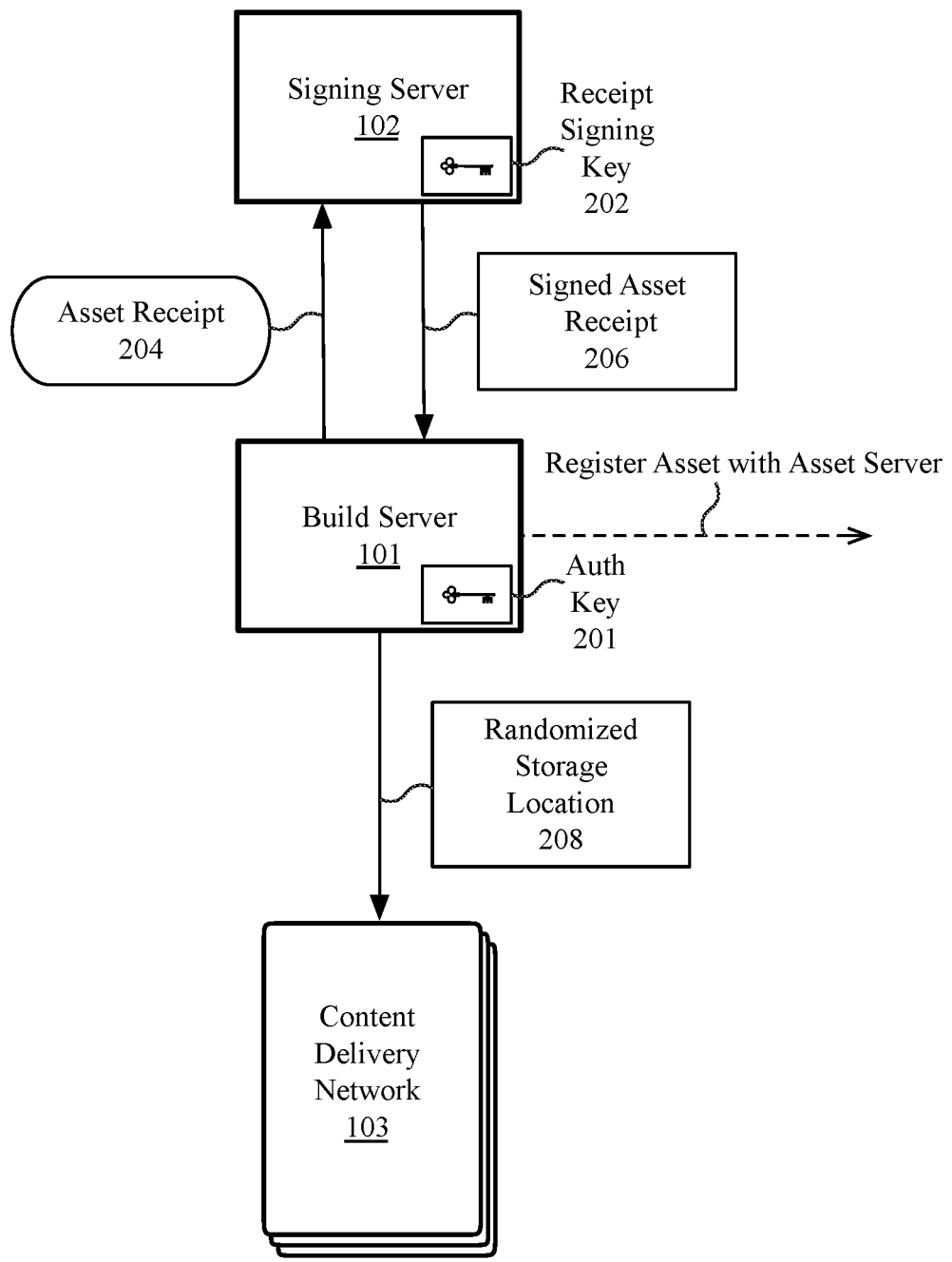
FIG. 2A-2C describe various sub-systems of the secure software update system, according to embodiments described herein.
Figure 2B:
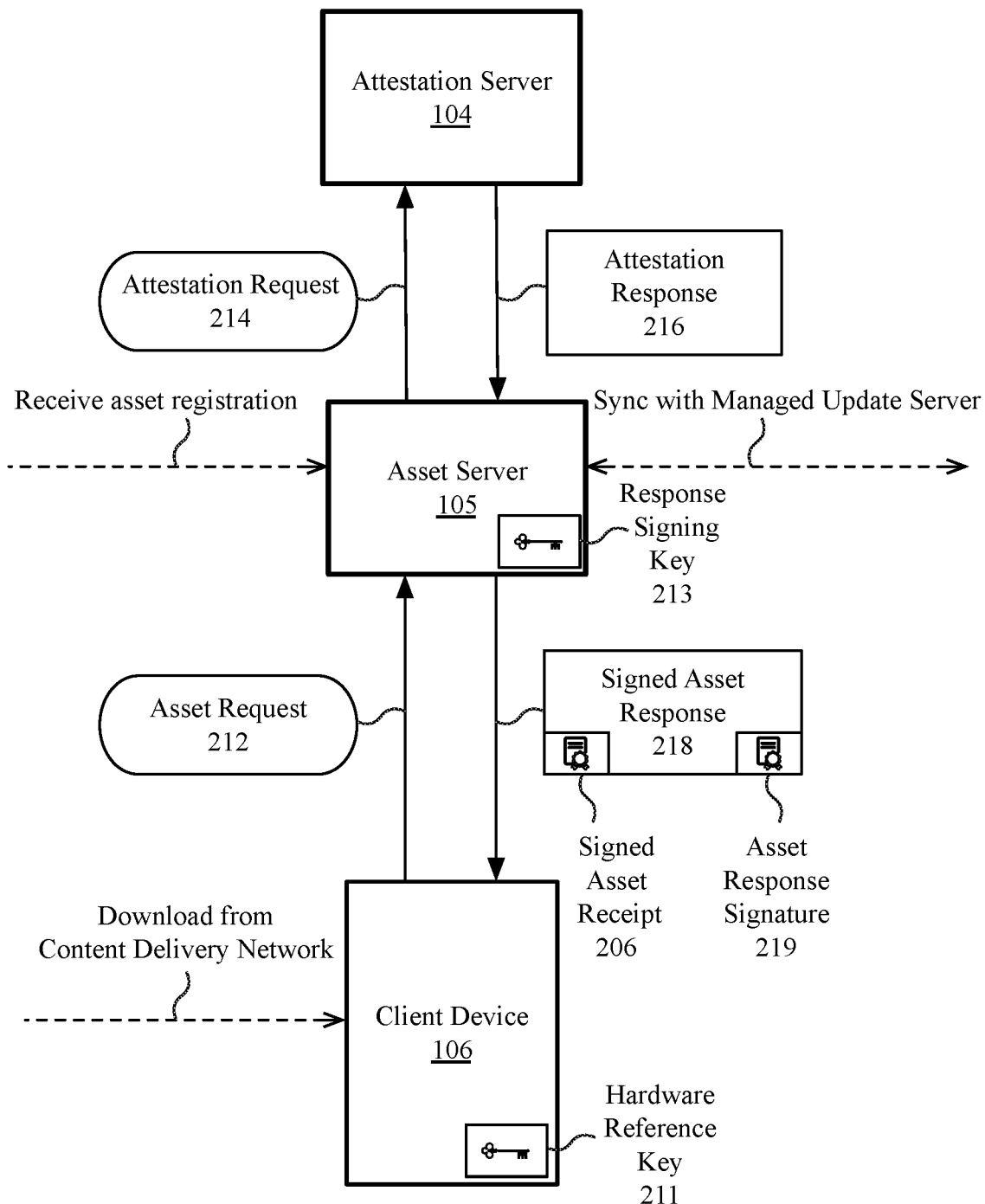
Figure 2C:
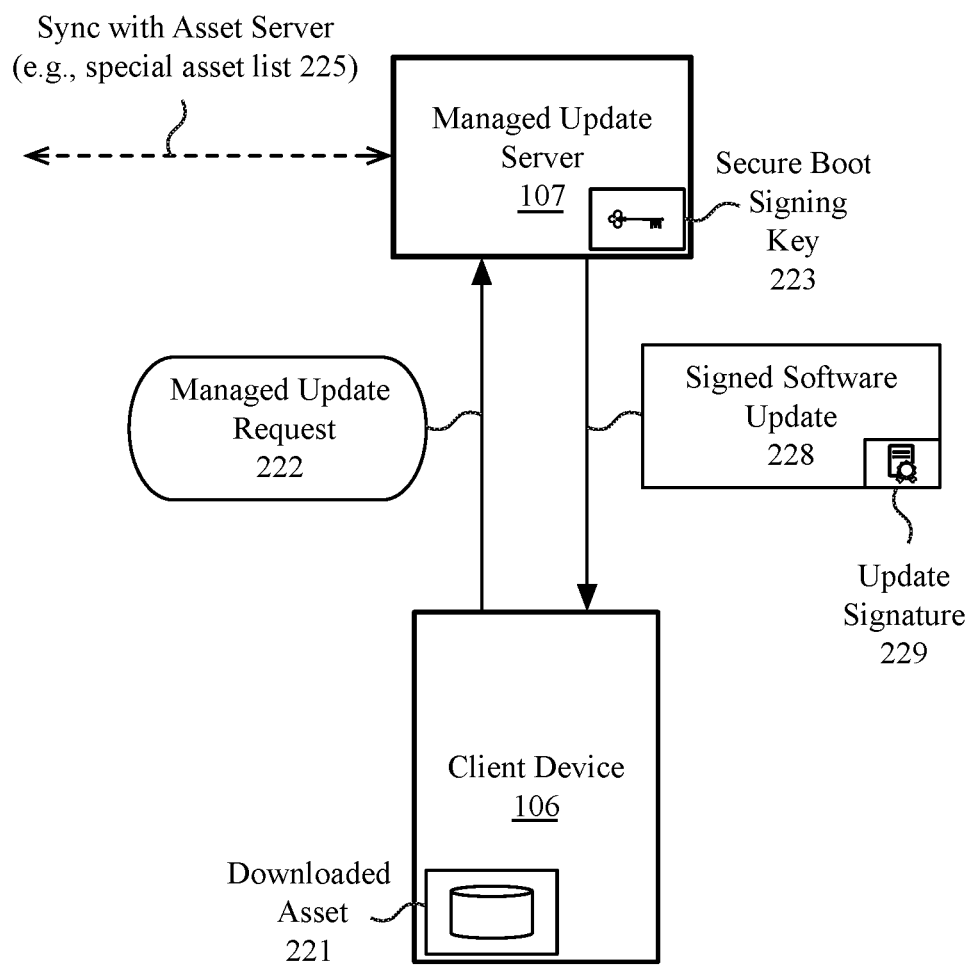

FIG. 2A-2C describe various sub-systems of the secure software update system 100 of FIG. 1. FIG. 2A illustrates a build sub-system 200 for assets associated with a software update. FIG. 2B illustrates an asset service sub-system 210 to facilitate access to software update assets for the client device 106. FIG. 2C illustrates a managed update sub-system for the client device 106. Operations for methods associated with the illustrated sub-systems are shown in FIGS. 3A-3C and FIGS. 4A-4B.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

FIG. 2A illustrates the build sub-system 200, which includes the build server 101, the signing server 102, and the content delivery network 103. The build server 101 can build an asset and generate the asset receipt 204. In one embodiment, while the build server 101 may build assets and generate receipts for those assets, the build server 101 may not include the cryptographic keys used to sign assets receipts. In such embodiment, overall security of the build sub-system 200 is enhanced by restricting asset receipt signing to one or more specific, dedicated servers that are accessible by a limited number of individuals. The build server 101 includes an authentication key 201 that identifies the build server 101 and authenticates the build server with the signing server 102. The build server 101 can authenticate with the signing server 102 using the authentication key 201. The build server 101 can then request the signing server 102 to generate a signed asset receipt 206 using a receipt signing key 202. The build server 101 can then register the asset and signed asset receipt 206 with the asset server 105. Registration can include indicating to the asset server 105 the randomized location 208 in which the build server 101 has stored the asset on the content delivery network 103. Storing the asset to a randomized location on the content delivery network 103 can limit the ability of third parties to browse well-known locations on the content delivery network 103 to acquire assets or asset catalogs.

Figure 3A:
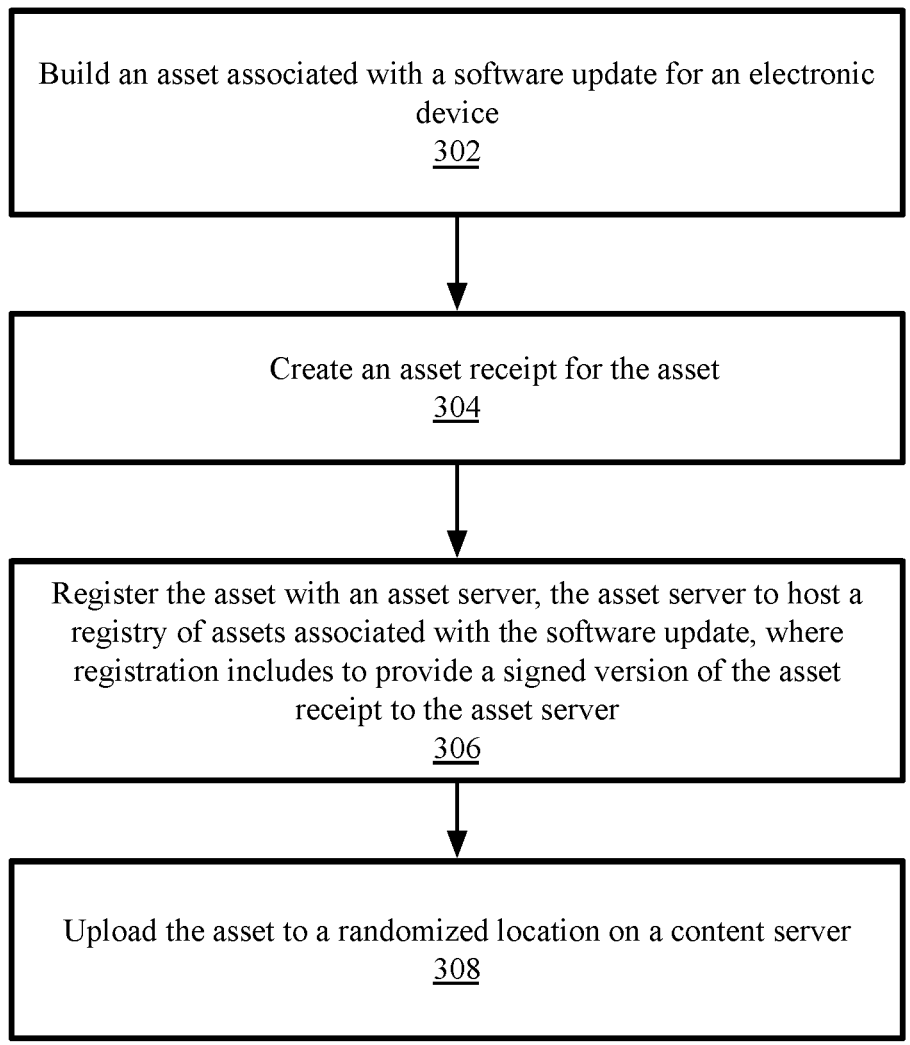
FIG. 3A-3C illustrate operations for methods associated with sub-systems of the secure software update system, according to embodiments described herein.

FIG. 3A illustrates a method 300 of operating the build sub-system 200, according to an embodiment. In one embodiment, the build server 101 can build an asset associated with a software update for an electronic device, as shown at block 302. The build server 101 can then create an asset receipt for the asset, as shown at block 304. The asset receipt can be used to attest to the validity of the asset, in that the asset was built by the official build server for the assets. The build server 101 can then register the asset with an asset server 105, as shown at block 306. The asset server 105 can host a registry of assets associated with the software update. As part of the registration the build server 101 can provide a signed version of the asset receipt to the asset server 105. The signature of the asset receipt can be used to attest to the validity of the asset receipt as well as to the validity of the build server 101. The build server 101 can then upload the asset to a randomized location on a content server, as shown at block 308. The content server, in one embodiment, is a server of the content delivery network 103.

FIG. 2B illustrates an asset service sub-system 210, which in one embodiment includes the asset server 105, attestation server 104, and client device 106. The asset server 105 can receive registration of assets from the build server 101 of build sub-system 200. The asset server 105 can also sync asset registration data with the managed update server 107, which is further described in relation to sub-system 220 of FIG. 2C.

In one embodiment, the client device 106 can send an asset request 212 to the asset server 105. The asset request 212 can include a hardware reference key 211 of the client device 106. The asset server 105 can validate the authenticity of the client device 106 using the hardware reference key 211. Validation of the authenticity of the client device 106 can include sending an attestation request 214 to the attestation server 104. The attestation server 104 can determine whether or not the client device 106 is authentic and can send an attestation response 216 to the asset server 105. Having determined the client device 106 is authentic or received attestation that the client device 106 is authentic, the asset server 105 can use a response signing key 213 to sign an asset response. The asset server 105 can then send the signed asset response 218 to the client device 106.

The signed asset response 218 can indicate assets that are specific to the client device 106. Depending on the configuration of the client device 106, the asset server 105 can provide an asset response 218 that indicates mass-market assets that are generally available to client devices, specialized assets for specific devices, such as development versions of the assets, or assets associated with an enterprise managed update program, which can be determined based on coordination between the asset server 105 and the managed update server 107.

In one embodiment, the signed asset response 218 includes the signed asset receipt 206 that was provided by the build server and, in one embodiment, signed by the signing server 102. The signed asset response 218 also includes an asset response signature, which is a signature applied using the response signing key 213 held by the asset server 105. The client device 106 can verify the signature on the signed asset receipt 206 and the asset response signature 219 of the signed asset response 218.

Figure 3B:
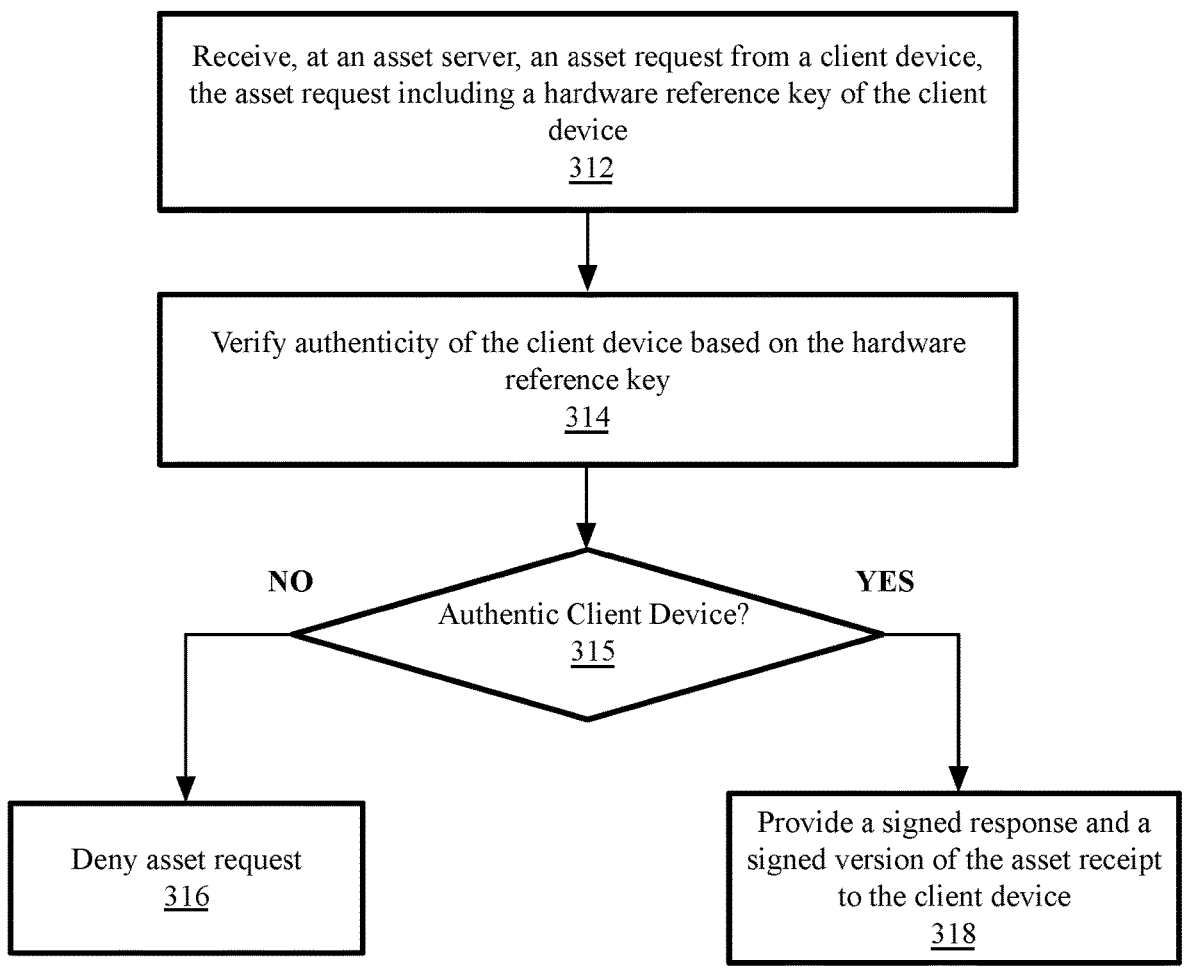

FIG. 3B illustrates a method 310 of operation of the asset server 105 of the asset service sub-system 210, according to one embodiment. As shown at block 312, the method 310 includes to receive, at the asset server 105, an asset request 212 including a hardware reference key 211 of the client device 106. The asset server 105 can verify authenticity of the client device 106 based on the hardware reference key 211 of the client device, as shown at block 314. Verifying authenticity can be performed via the attestation server 104 in response to the attestation request 214 sent by the asset server 105. If the requesting client device 106 is an authentic client device, as determined at block 315, the asset server 105 can provide a signed response and a signed version of the asset receipt to the client device 106, as shown at block 318. Otherwise, the asset server can deny the asset request at block 316.

Figure 3C:
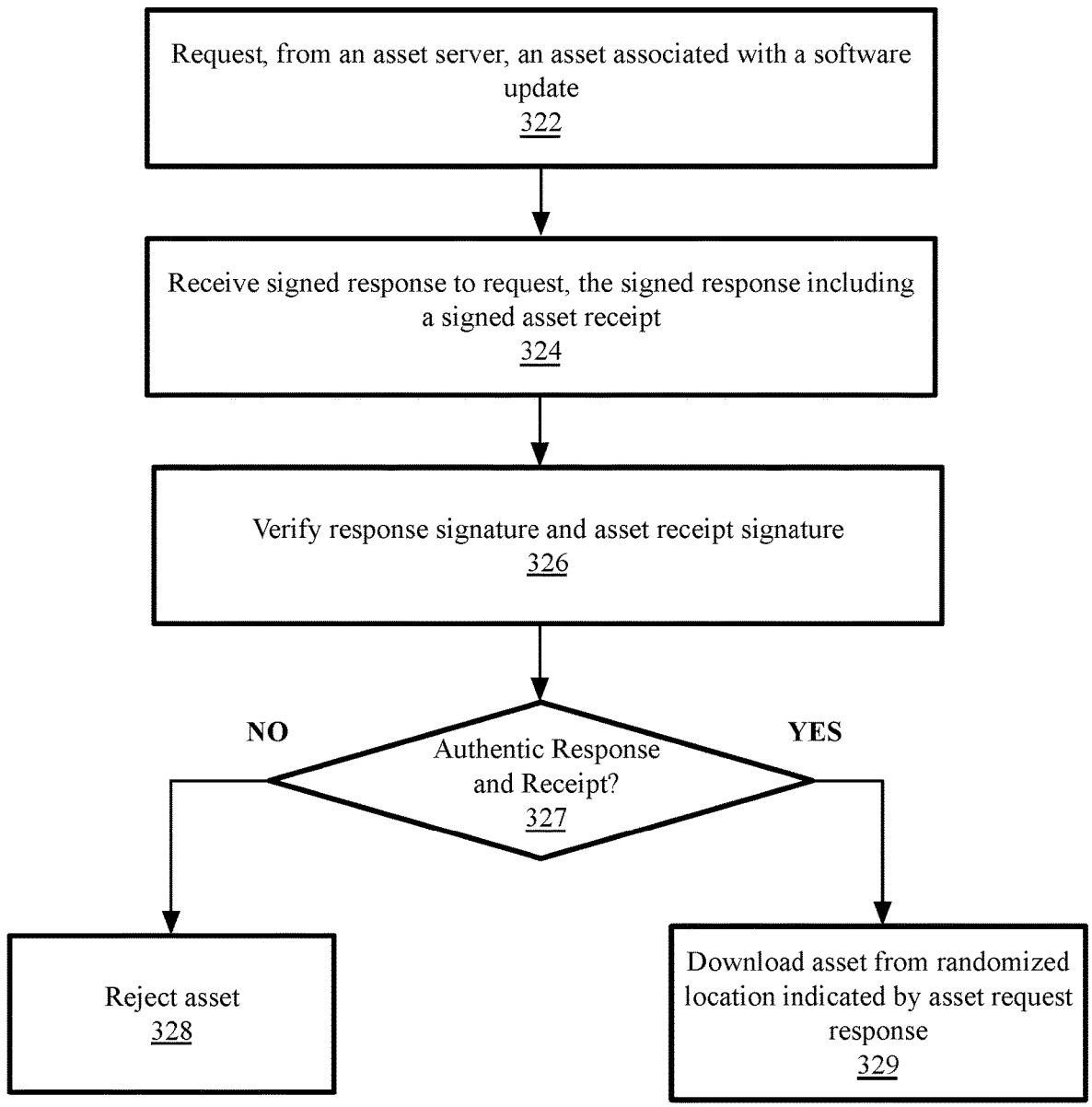

FIG. 3C illustrates a method 320 of operation of the client device 106 of the asset service sub-system 210, according to an embodiment. As shown at block 322, a client device 106 can request, from the asset server 105, an asset associated with a software update. As shown at block 324, the client device 106 can receive a signed response to the request, where the signed response includes a signed asset receipt 206. The client device 106 can verify the asset response signature 219 and the signature of the signed asset receipt 206, as shown at block 326. If the asset response and receipt are authentic, as determined at block 327, the client device 106 can download the asset from the randomized location indicated by the asset request response, as shown at block 329. Otherwise, the client device 106 can reject the asset at block 328, as the asset may not be a legitimate software module or may be a legitimate software module that includes modifications not included in the asset as originally uploaded by the build server 101.

FIG. 2C illustrates a managed update sub-system 220 in which access to a software update and/or specific assets associated with the software update can be delayed. In one embodiment, the managed update sub-system 220 can be used to gate installation of assets acquired via the asset service sub-system 210 FIG. 2B. The client device 106 can send a managed update request 222 to the managed update server 107. The managed update request 222 can be received by the managed update server 107, which can then determine whether a downloaded asset 221 can be installed as part of a software update to the client device 106. The downloaded asset 221 can be downloaded by the client device 106 based on catalog information provided to the client device 106 by the asset server 105. The asset server 105 can synchronize with the managed update server 107 with respect to asset versions that are available to the client device 106 when the client device is enrolled in an enterprise managed update system. For example, the managed update server 107 and the asset server 105 can synchronize to determine a special asset list 225, which lists the current asset versions to be made available for a client device 106 in a managed update system.

If the downloaded asset 221 can be installed, the downloaded asset can be included as part of a managed software update. A signed software update 228 can be generated by the managed update server 107, which, in one embodiment, can be signed by a secure boot signing key 223 associated with the managed update server 107. The secure boot signing key 223 can be used to apply an update signature 229 to a signed software update 228, enabling the client device 106 to securely boot the signed software update 228. The managed update server 107 includes a secure boot signing key 223 to enable the generation of special boot images for the client device 106 when the client device is enrolled in a specific enterprise managed update program. Such images may differ from the boot images deployed to mass market devices.

Figure 4A:
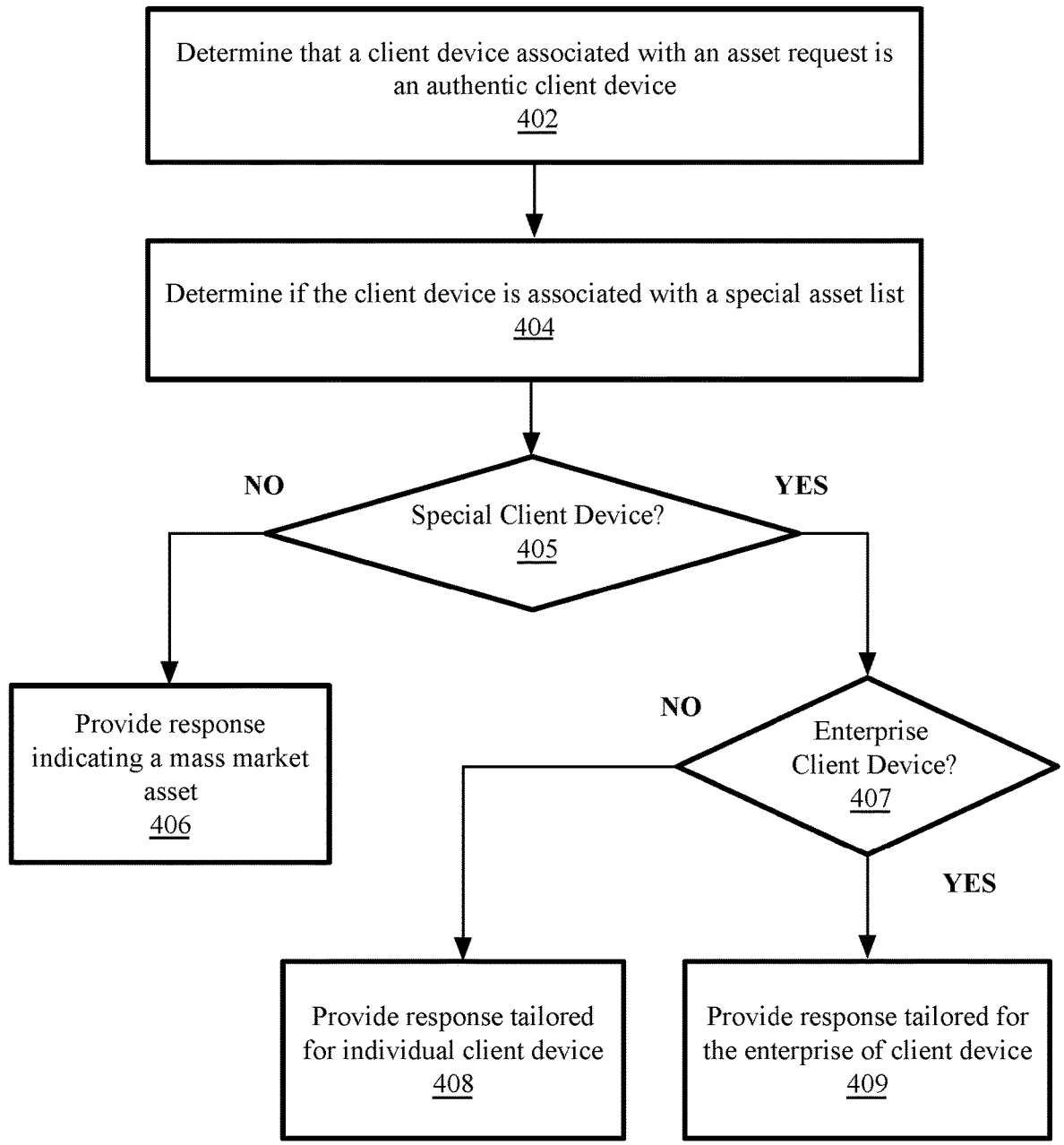
FIG. 4A-4B illustrate additional operations for additional methods associated with sub-systems of the secure software update system, according to embodiments described herein.
Figure 4B:
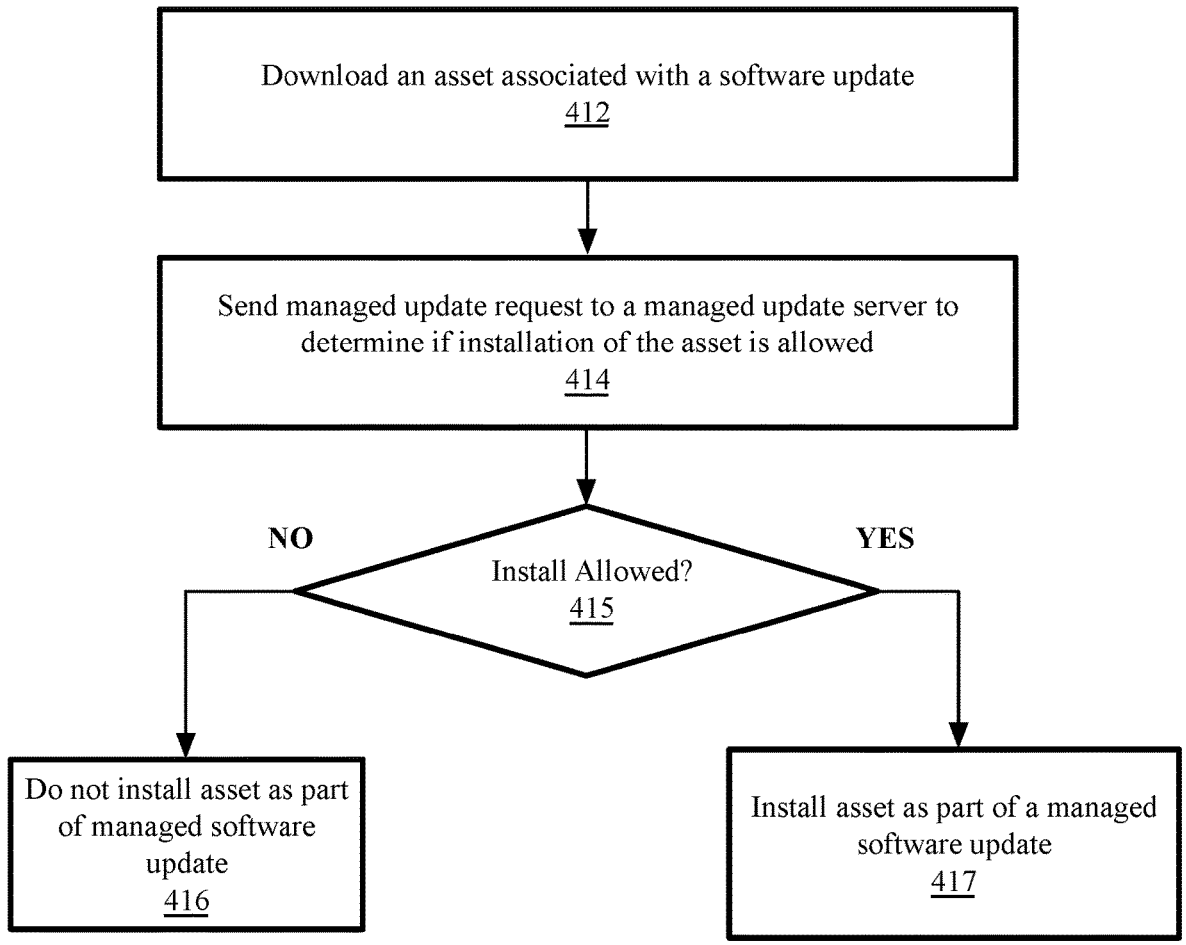

FIG. 4A-4B illustrate methods to perform operations associated with managed updates of a client device, according to embodiments described herein. FIG. 4A illustrates a method 400 by which a device specific asset can be provided to a client device. FIG. 4B illustrates a method 410 of gating asset installation for a client device that is enrolled in a managed update system.

As part of method 400 shown in FIG. 4A, an asset server 105, at block 402, can determine that a client device 106 associated with an asset request is an authentic client device. In one embodiment, the asset server 105 can determine that the client device 106 is authentic using operations of method 310 illustrated in FIG. 3B. As shown at block 404, the asset server 105, in consultation with managed update server 107, can determine if the client device 106 is associated with a special asset list 225. The special asset list 225, in one embodiment, can list assets associated with client devices in an enterprise managed update system. In one embodiment, the special asset list 225, or a similar list, registry, or database, can be used to determine, at block 405, if the client device 106 is a special client device. The client device 106 is a special client device if the client device is, for example, part of an enterprise managed software update system in which access to software updates are delayed. The client device 106 is also a special client device if the device is on a list of devices for which access to software updates are accelerated. For example, the client device can be part of a beta software update program or another early access software update program in which development versions of assets may be supplied during a software update.

If at block 405 the client device 106 is determined not to be a special client device, the asset server 105 can provide a response that indicates a mass market asset, as shown at block 406. If at block 405 the client device 106 is determined to be a special client device, the asset server 105 can determine, at block 407, if the client device is an enterprise client device. Specifically, the asset server 105 can determine if the client device 106 is enrolled in an enterprise managed software update system that is managed in concert with the managed software update server 107. If, at block 407, the client device 106 is determined to be an enterprise client device, or otherwise enrolled in an enterprise managed update system, the asset server 105 can provide a response that is tailored for the enterprise of the client device, as shown at block 409. If the client device 106 is a special client device but is not an enterprise client device, in one embodiment the asset server 105 can provide a response that is tailored for the individual client device, as shown at block 408.

The operations of method 400 are exemplary of one embodiment described herein and the specific operations may vary across embodiments. Additional techniques of tailoring assets to multiple specific client devices can also be employed. For example, client devices associated with members of a team of internal software developers of a device vender can be added to a list of special devices, such that those devices can receive the latest published assets of that team, even if those assets are development versions, while other assets may be production versions of those assets.

As part of method 410 shown in FIG. 4B, a client device 106 can download an asset (e.g., downloaded asset 221) associated with a software update, as shown at block 412. The client device 106, as shown at block 414, can send a managed update request 222 to the managed update server 107 to determine if installation of the asset is allowed. If at block 415 the managed update server 107 indicates install is allowed, the client device 106 can install the asset as part of a managed software update, as shown at block 417. If the managed update server 107 indicates that install is not allowed, for example if the enterprise managed update policy indicates that the asset is too new of a version to be installed on the client device 106, the client device will not install the asset as part of the managed software update, as shown at block 416. Additionally, the method 410 can be used to prevent unauthorized rollbacks of assets once a newer version of the asset has been installed. In one embodiment, the method 410 can be applied to client devices in general, such that once a version of an asset has been installed, a rollback to a previous version is not allowed.

Processing Components of a Client Device

Figure 5A:
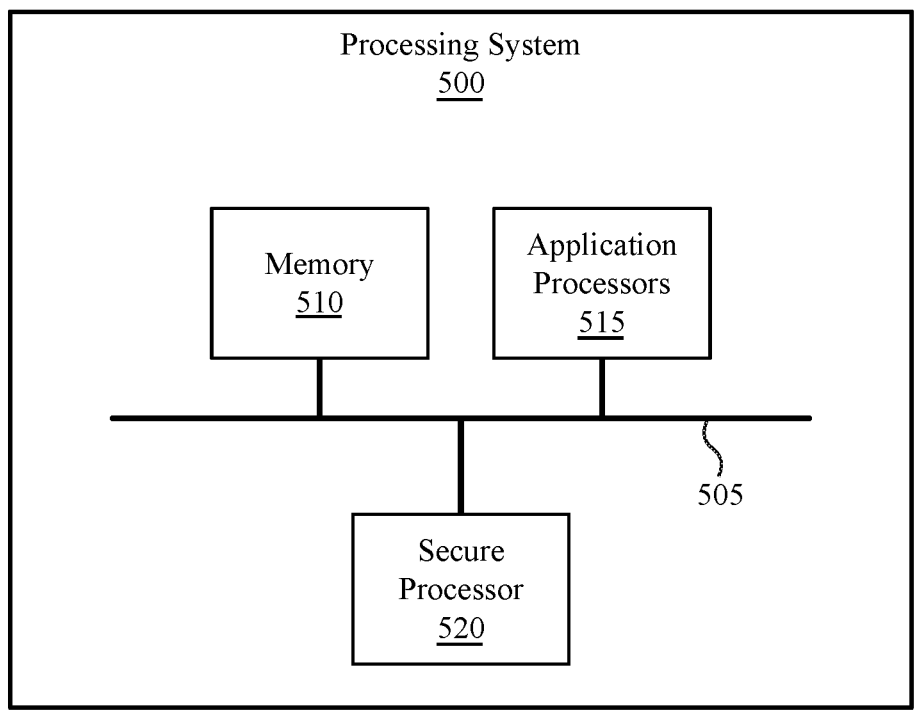
FIG. 5A-5B illustrate block diagrams of processing components of a client device, according to embodiments described herein.
Figure 5B:
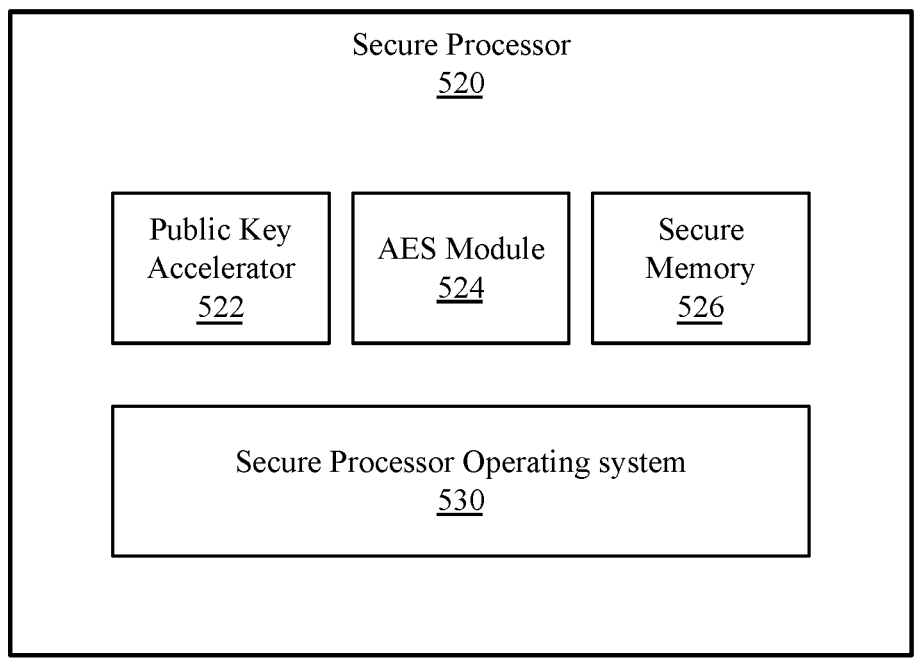

FIG. 5A-5B illustrate block diagrams of processing components of a client device 106 as described herein. FIG. 5A illustrates a processing system 500 that enables secure and authenticated access to software update assets and provides processing resources to enable an operating system of the client device 106 to install such assets. FIG. 5B illustrates a secure processor 520 of the processing system 500 that can be used to accelerate cryptographic operations and can securely store hardware keys associated with the client device 106.

The processing system 500 shown in FIG. 5A can perform operations including generating one or more hardware reference keys, securely storing hardware reference keys, and attesting to details of the processing system 500 (e.g., processor type). The processing system 500 can additionally attest to the operating system, including operating system version, in use when the one or more hardware reference keys are generated.

In one embodiment, the processing system 500 includes memory 510, one or more processors, such as application processors 515, and a secure processor 520. Instructions for an operating system can be stored in memory 510, where the instructions can be executed at least in part by the application processors 515. The processing system 500, in one embodiment, can be a system on a chip (SoC) in which at least the application processors 515 and the secure processor 520 are integrated into a single integrated circuit. The memory 510, application processors 515, and secure processor 520 can be coupled via an interconnect 505, which can include one or more buses, rings, fabrics, or other types of interconnects.

The secure processor 520 is further illustrated in FIG. 5B. In one embodiment, the secure processor 520 includes, but is not limited to a public key accelerator 522, an advanced encryption standard (AES) module 524, and a secure memory 526. The secure processor 520 can also execute a dedicated secure processor operating system 530 that is separate from an operating system executed by the application processor. In one embodiment, the secure processor operating system 530 can use the accelerators and modules of the secure processor 520 to generate keys used to demonstrate that a client device 106 is a trusted client device. One or more hardware reference keys can be generated by the secure processor to demonstrate authenticity and trustworthiness of a client device 106 to the attestation server 104.

In one embodiment, a hardware reference key can be generated in part based on a unique identifier (UID) stored in secure memory 526. The secure processor operating system 530 can generate a seed and pass the seed to the AES module 524. The AES module 524 can read the UID from the secure memory 526 and encrypt the seed and the UID. The AES module 524 can then pass the seed, the encrypted seed, and the encrypted UID to the public key accelerator 522. The public key accelerator 522 can then generate one more key pairs having public and private keys. In one embodiment, the public key accelerator 522 can generate the one or more key pairs using information such as the version of the secure processor operating system 530. The one or more key pairs can be used as hardware reference keys to attest to the validity of the client device 106 during an asset request. For example, a public portion of the hardware reference key can be provided along with additional device information such as one or more chip identifiers, a processor type or class, and one or more signatures. The provided information can be analyzed by an attestation server 104 to determine if the client device 106 is a valid and/or legitimate client device that is authorized to receive catalog data for assets associated with a software update.

Figure 6:
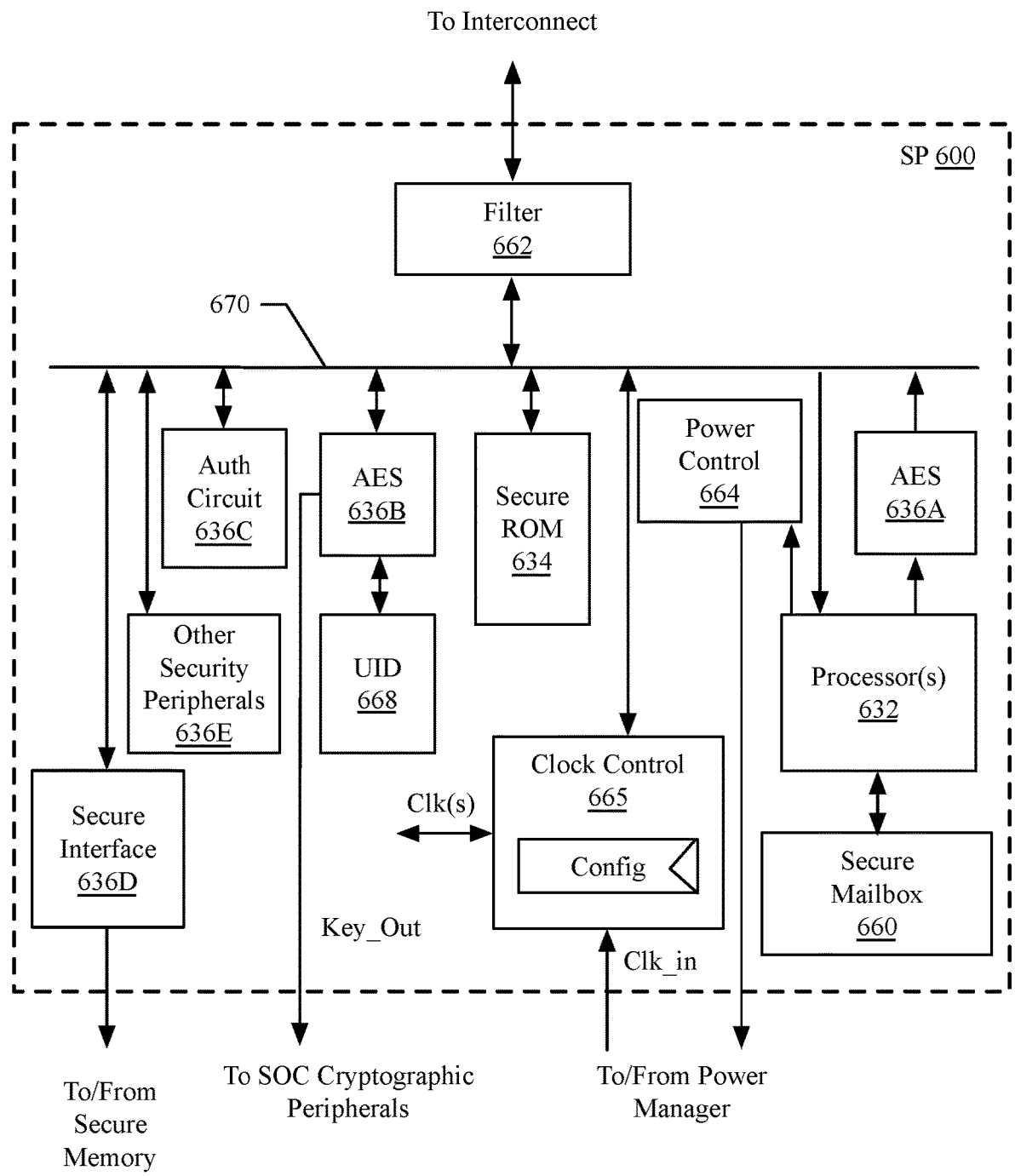
FIG. 6 is block diagram illustrating a secure processor, according to an embodiment.

FIG. 6 is block diagram illustrating a secure processor 600, according to an embodiment. The secure processor 600 can be a variant of the secure processor 520 of FIG. 5A-5B. In the illustrated embodiment, the secure processor 600 includes one or more processor(s) 632, security peripherals 636A-636E, the secure ROM 634, secure mailbox 660, filter 66 control unit 664, clock control unit 665, and a unique identifier (UID) 668. The filter 662 may be coupled to the interconnect 505 of FIG. 5A and to a local interconnect 670 to which the other components of the secure processor 600 are also coupled. The local interconnect 670 can be configured as a bus-based interconnect or another interconnect such as a packet-based, hierarchical, point-to-point, or cross bar fabric. In one embodiment, the security peripherals 636A-636E coupled with the local interconnect 670 include a set of AES encryption engines 636A-636B, an authentication circuit 636C, a secure interface unit 636D, and other security peripherals 636E.

In one embodiment, a first AES encryption engine 636A can couple to the processor(s) 632. The processor(s) 632 are one or more processor cores that manage operations within the secure processor. The processor(s) 632 can execute a secure operating system that is separate from the host operating system, such as the operating system executed by the application processors 515 of FIG. 5A. In one embodiment, the secure processor operating system is a microkernel based operating system that is optimized for mobile or embedded processors. The processor(s) 632. can couple with the secure mailbox 660 and the power control unit 664.

The power control unit 664 can be coupled to the clock control unit 665 and an external power manager. The clock control unit 665 can also be coupled to the power manager, which can cause the clock control unit 665 to enable or disable the input clock signal. The clock control unit 665 can then provide clock signals to the other components of the secure processor 600. In one embodiment, a second AES encryption engine 636B can couple with a set of fuses that define the UID 668, which at least quasi-uniquely identifies the specific device that includes the secure processor 600. The second AES encryption engine 636B may be responsible for secure key generation and can output generated keys to cryptographic circuits and/or other circuitry within the SoC that houses the secure processor 600. For example, in one embodiment the second AES encryption engine 636B can act as the public key accelerator 522 as in FIG. 5B.

In one embodiment, the filter 662 can be configured to tightly control access to the secure processor 600 to increase the isolation of the secure processor from the rest of the SoC that contains the secure processor (e.g., application processor 515 of FIG. 5A). In an embodiment, the filter 662 may permit read/write operations from an interconnect (e.g., interconnect 505 of FIG. 5A) to enter the secure processor 600 only if the operations address the secure mailbox 660. The secure mailbox 660 may include an inbox and an outbox, which each may be first-in, first-out (FIFO) buffers. The FIFO buffers may have any size and can contain any number of entries, where each entry can store data from a read or write operation. In one embodiment, the inbox is configured to store write data from write operations sourced from the interconnect, while the outbox can store write data from write operations sourced by the processor(s) 632. In one embodiment, the filter 662 can permit write operations to the address assigned to the inbox portion of the secure mailbox 660 and read operations to the address assigned to the outbox portion of the secure mailbox 660. All other read/write operations may be discarded or blocked by the filter 662.

In one embodiment, the filter 662 responds to other read/write operations with an error and can sink write data associated with a filtered write operation without passing the write data on to the local interconnect 670. In one embodiment, the filter 662 can also supply nonce data as read data for a read operation that is filtered. The supplied nonce data can be any data that is unrelated to the address resource within the secure processor 600, and may be all zeros, all ones, random data from a random number generator, data programmed into the filter 662 to respond as read data, the address of the read transaction, or other data. In an embodiment, the filter 662 only filters incoming read/write operations, allowing components within the secure processor 600 to have full access to other components to which the secure processor is integrated. In such embodiment, the filter 662 will not filter responses from the SoC fabric that are provided in response to read/write operations issued by the secure processor 600.

In one embodiment, write data for write operations generated by the processor(s) 632 that are to be transmitted by the secure processor 600 may optionally be encrypted by an AES encryption engine 636A-636B. An attribute of the write operation issued by the processor(s) 632 may indicate whether data is to be encrypted. The attribute may be a packet field, in packet-based embodiments, a signal transmitted with the write operation, in bus-based embodiments, or may be transmitted in any other desired fashion. In the illustrated embodiment, AES encryption engines 636A-636B are described. However, additional or alternate encryption circuits can be included accelerate other encryption algorithms, including but not limited to ECC, RSA, or DES.

The power control unit 664 may be configured to control the power gating of the secure processor 600. The power control unit 664 may be coupled to processor(s) 632, and may monitor the processor to determine when power gating is to be requested. Responsive to determining that power gating is to be requested, the power control unit 664 can transmit a power gating request to an external power manager. The power manager can determine that the secure processor 600 is to be powered gated and can then power gate the secure processor 600. The power control unit 664 may also be configured to control clock gating in the secure processor 600. Alternatively, the clock control unit 665 may be configured to control the clock gating in the secure processor 600. Clock gating may be controlled locally or may be requested from the power manager in various embodiments.

The clock control unit 665 may be configured to control the local clocks in the secure processor 600. The clock control unit 665 may be coupled to receive an input clock and may generate the clocks local to the secure processor 600. The clock control unit 665 may be programmable (e.g. by processor(s) 632) with clock ratios, clock enables, clock gating enables, etc. for the various clocks in the secure processor 600.

The secure ROM 634 is coupled to the local interconnect 670 and may respond to an address range assigned to the secure ROM 634 on the local interconnect 670. The address range may be hardwired, and the processor(s) 632 may be hardwired to fetch from the address range at boot to boot from the secure ROM 634. The secure ROM 634 may include the boot code for the secure processor 600 as well as other software executed by processor(s) 632 during use (e.g. the code to process inbox messages and generate outbox messages, code to interface to the security peripherals 636A-636E, etc.). In an embodiment, the secure ROM 634 may store all the code that is executed by processor(s) 632 during use.

In one embodiment, the security peripherals 636A-636E include an authentication circuit 636C that is used to perform authentication operations for the secure processor 600. The authentication circuit 636C may implement one or more authentication algorithms, such as but not limited to a secure hash algorithm (SHA) such as SHA-1, SHA-2, SHA-3, or any other authentication algorithm. In one embodiment, the authentication circuit can work in concert with other security peripherals 636E within the secure processor 600.

In addition to security peripherals designed to perform specific functions, there may also be security peripherals that are interface units for secure interfaces such as the secure interface unit 636D. In the illustrated embodiment, the secure interface unit 636D is an interface to an off-chip secure memory that may be used to secure storage by the secure processor 600. The secure memory can be encrypted using an ephemeral key that is based in part on the UID 668. The ephemeral key is occasionally re-generated. For example, and in one embodiment the secure processor 600 can re-generate the ephemeral key during each boot cycle. Only the secure processor 600 has access to the ephemeral key used to access secure memory. The secure memory enables the secure processor 600 to have secure access to system memory to store data that may not fit within memory internal to the secure processor 600.

Exemplary Device Architectures

Figure 7:
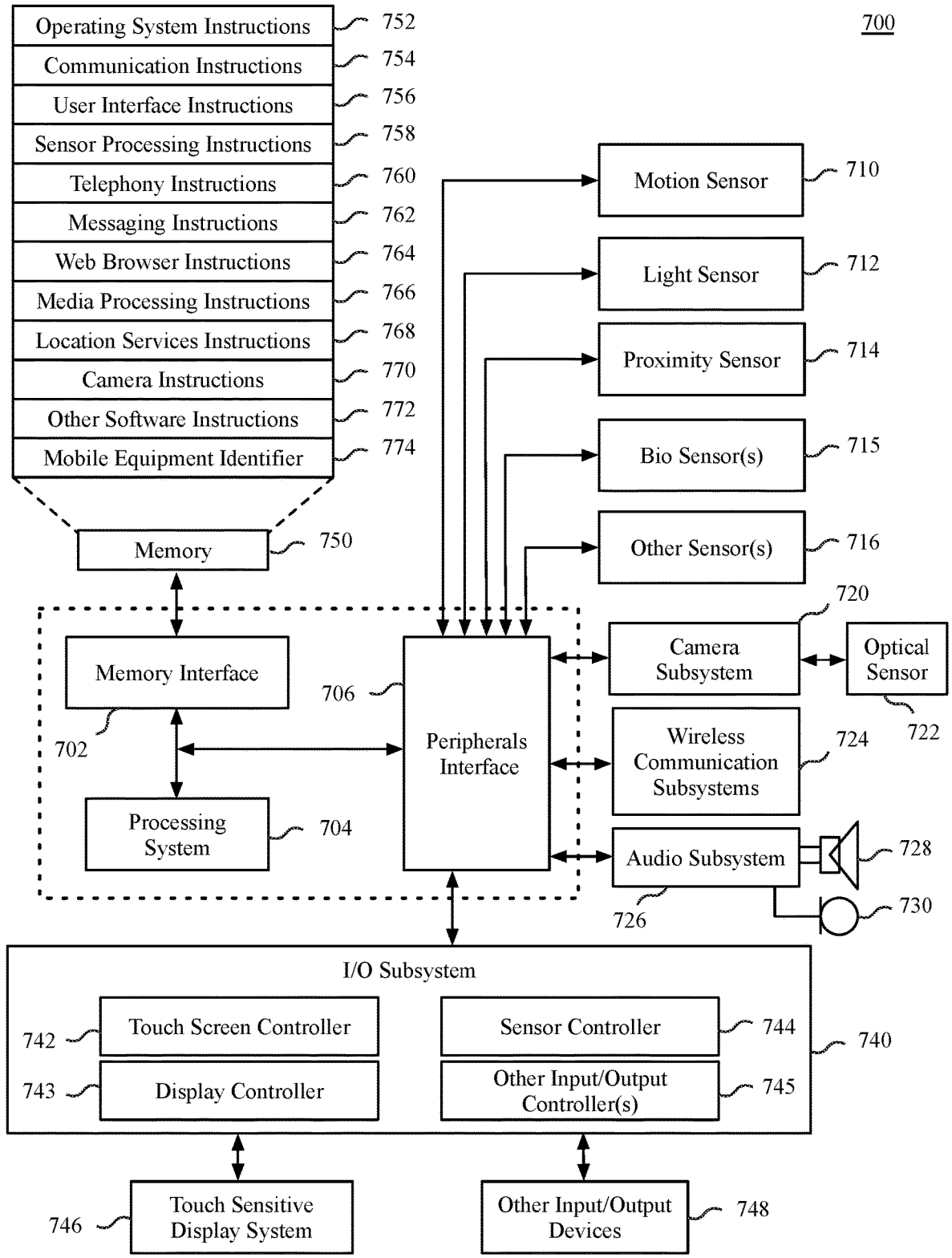
FIG. 7 is a block diagram of a device architecture for a mobile or embedded device, according to an embodiment.

FIG. 7 is a block diagram of a device architecture 700 for a mobile or embedded device, according to an embodiment. The device architecture 700 includes a memory interface 702, a processing system 704 including one or more data processors, image processors and/or graphics processing units, and a peripherals interface 706. The various components can be coupled by one or more communication buses or signal lines. The various components can be separate logical components or devices or can be integrated in one or more integrated circuits, such as in a system on a chip integrated circuit. The device architecture 700 can be used to implement a client device 106 as described herein.

The memory interface 702 can be coupled to memory 750, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the mobile device functionality. One or more biometric sensor(s) 715 may also be present, such as a fingerprint scanner for fingerprint recognition or an image sensor for facial recognition. Other sensors 716 can also be connected to the peripherals interface 706, such as a positioning system (e.g., GPS receiver), a temperature sensor, or other sensing device, to facilitate related functionalities. A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the wireless communication subsystems 724 can depend on the communication network(s) over which a mobile device is intended to operate. For example, a mobile device including the illustrated device architecture 700 can include wireless communication subsystems 724 designed to operate over a GSM network, a CDMA network, an LTE network, a Wi-Fi network, a Bluetooth network, or any other wireless network. In particular, the wireless communication subsystems 724 can provide a communications mechanism over which a media playback application can retrieve resources from a remote media server or scheduled events from a remote calendar or event server.

An audio subsystem 726 can be coupled to a speaker 728 and a microphone 730 to facilitate voice-enabled functions, such as voice recognition, voice replication, digital recording, and telephony functions. In smart media devices described herein, the audio subsystem 726 can be a high-quality audio system including support for virtual surround sound.

The I/O subsystem 740 can include a touch screen controller 742 and/or other input controller(s) 745. For computing devices including a display device, the touch screen controller 742 can be coupled to a touch sensitive display system 746 (e.g., touch-screen). The touch sensitive display system 746 and touch screen controller 742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 746. Display output for the touch sensitive display system 746 can be generated by a display controller 743. In one embodiment, the display controller 743 can provide frame data to the touch sensitive display system 746 at a variable frame rate.

In one embodiment, a sensor controller 744 is included to monitor, control, and/or processes data received from one or more of the motion sensor 710, light sensor 712, proximity sensor 714, or other sensors 716. The sensor controller 744 can include logic to interpret sensor data to determine the occurrence of one of more motion events or activities by analysis of the sensor data from the sensors.

In one embodiment, the I/O subsystem 740 includes other input controller(s) 745 that can be coupled to other input/control devices 748, such as one or more buttons, rocker switches, thumb-wheel, infrared port, USB port, and/or a pointer device such as a stylus, or control devices such as an up/down button for volume control of the speaker 728 and/or the microphone 730.

In one embodiment, the memory 750 coupled to the memory interface 702 can store instructions for an operating system 752, including portable operating system interface (POSIX) compliant and non-compliant operating system or an embedded operating system. The operating system 752 may include instructions for handling basic system services and for performing hardware dependent tasks. In some implementations, the operating system 752 can be a kernel.

The memory 750 can also store communication instructions 754 to facilitate communicating with one or more additional devices, one or more computers and/or one or more servers, for example, to retrieve web resources from remote web servers. The memory 750 can also include user interface instructions 756, including graphical user interface instructions to facilitate graphic user interface processing.

Additionally, the memory 750 can store sensor processing instructions 758 to facilitate sensor-related processing and functions; telephony instructions 760 to facilitate telephone-related processes and functions; messaging instructions 762 to facilitate electronic-messaging related processes and functions; web browser instructions 764 to facilitate web browsing-related processes and functions; media processing instructions 766 to facilitate media processing-related processes and functions; location services instructions including GPS and/or navigation instructions 768 and Wi-Fi based location instructions to facilitate location based functionality; camera instructions 770 to facilitate camera-related processes and functions; and/or other software instructions 772 to facilitate other processes and functions, e.g., security processes and functions, and processes and functions related to the systems. The memory 750 may also store other software instructions such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. A mobile equipment identifier, such as an International Mobile Equipment Identity (IMEI) 774 or a similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions may be implemented in hardware and/or in software, including in one or more signal processing and/or application specific integrated circuits.

Figure 8:
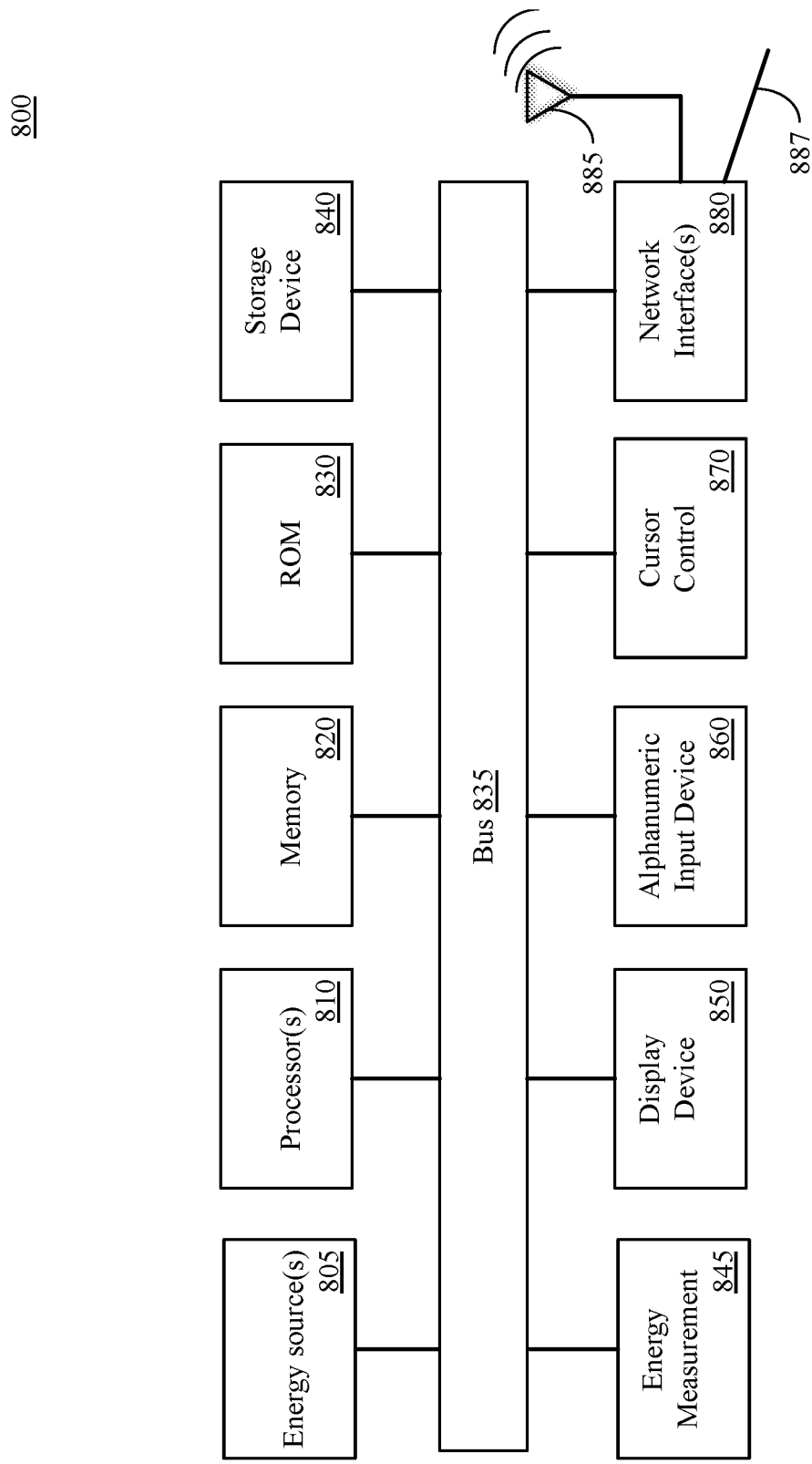
FIG. 8 is a block diagram of a computing system, according to embodiments described herein.

FIG. 8 is a block diagram of a computing system 800, according to embodiments described herein. The computing system 800 is intended to represent a range of computing systems including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system of FIG. 8 may be used to provide the computing device and/or a server device to which the computing device may connect. For example, the computing system 800 can be part of any of the server devices described herein, such as, but not limited to the build server 101, signing server 102, or a server of a content delivery network 103. The computing system 800 can also be or can be included within the attestation server 104, asset server 105, or managed update server 107 described herein.

The computing system 800 includes bus 835 or other communication device to communicate information, and processor(s) 810 coupled to bus 835 that may process information. While the computing system 800 is illustrated with a single processor, the computing system 800 may include multiple processors and/or co-processors. The computing system 800 further may include random access memory (RAM) or other dynamic storage device coupled to the bus 835. The RAM can be configured as main memory 820 and can store information and instructions that may be executed by processor(s) 810. Main memory 820 may also be used to store temporary variables or other intermediate information during execution of instructions by the processor(s) 810.

The computing system 800 may also include read only memory (ROM) 830 and/or another data storage device 840 coupled to the bus 835 that may store information and instructions for the processor(s) 810. The data storage device 840 can be or include a variety of storage devices, such as a flash memory device, a magnetic disk, or an optical disc and may be coupled to computing system 800 via the bus 835 or via a remote peripheral interface.

The computing system 800 may also be coupled, via the bus 835, to a display device 850 to display information to a user. The computing system 800 can also include an alphanumeric input device 860, including alphanumeric and other keys, which may be coupled to bus 835 to communicate information and command selections to processor(s) 810. Another type of user input device includes a cursor control 870 device, such as a touchpad, a mouse, a trackball, or cursor direction keys to communicate direction information and command selections to processor(s) 810 and to control cursor movement on the display device 850. The computing system 800 may also receive user input from a remote device that is communicatively coupled via one or more network interface(s) 880.

The computing system 800 further may include one or more network interface(s) 880 to provide access to a network, such as a local area network. The network interface(s) 880 may include, for example, a wireless network interface having antenna 885, which may represent one or more antenna(e). The computing system 800 can include multiple wireless network interfaces such as a combination of Wi-Fi, Bluetooth®, near field communication (NFC), and/or cellular telephony interfaces. The network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, the network interface(s) 880 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 800 can further include one or more energy sources 805 and one or more energy measurement systems 845. Energy sources 805 can include an AC/DC adapter coupled to an external power source, one or more batteries, one or more charge storage devices, a USB charger, or other energy source. Energy measurement systems include at least one voltage or amperage measuring device that can measure energy consumed by the computing system 800 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing specification, the invention has been described regarding specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

While the embodiments have been described in connection with particular examples thereof, the true scope of the embodiments should not be so limited since other modifications will become apparent to the skilled practitioner upon a study of the drawings, specification, and following claims.

What is claimed is:

1. A system for managing a software update for a client device coupled to a network, the system comprising:
 a first server device coupled to the network, the first server device configured to:
  receive an asset request from the client device, the asset request including a cryptographic identifier of the client device;
  in response to receipt of the asset request, verify the client device based, at least in part, on the cryptographic identifier;
  upon to verification of the client device, provide a response signed by the first server device to the client device, the signed response including a storage location for an asset; and
 a second server device configured to:
  register the asset with the first server device, the registration including providing a signed receipt and the storage location for the asset, wherein
   the signed response includes the signed receipt for the asset, and the client device is configured to:
   authenticate the signed receipt before the asset is retrieved from the storage location.

2. The system of claim 1, wherein the storage location for the asset is a randomized storage location on a content server.

3. The system of claim 1, wherein the first server device is further configured to:
 request cryptographic verification of authenticity of the client device from a fourth server device.

4. The system of claim 1, wherein the first server device is further configured to:
 host a registry of assets associated with the software update for the client device.

5. The system of claim 1, wherein the cryptographic identifier comprises:
 one or more hardware keys derived from or stored within secure memory of the client device.

6. The system of claim 5, wherein the first server device being configured to verify the client device based, at least in part, on the cryptographic identifier of the client device comprises the first server device being configured to:
 verify the one or more hardware keys using a cryptographic technique.

7. The system of claim 1, further comprising:
 a third server device configured to generate the signed receipt on behalf of the second server device.

8. The system of claim 7, wherein the second server device is further configured to request the third server device to sign a receipt for the asset and provide authentication credentials to the third server device.

9. The system of claim 8, wherein the second server device being configured to request to the third server device to sign the receipt for the asset includes the second server device configured to receive the asset and authentication credentials for the second server device and wherein the third server device is further configured to verify the authentication credentials for the second server device and, after verification of the authentication credentials, to sign the receipt for the asset, and provide the signed receipt for the asset to the second server device.

10. The system of claim 1, further comprising:
 a fifth server device configured to manage access to the software update for the client device and to determine visibility of the software update to the client device and gate installation of the asset on the client device.

11. The system of claim 10, wherein the fifth server device is further configured to restrict access to the software update for the client device according to a delayed update schedule.

12. The system of claim 11, wherein the client device is further configured to query the fifth server device before an install of the software update to determine whether the software update is enabled for the client device.

13. The system of claim 12, wherein the client device is further configured to query the fifth server device before the install of an asset associated with the software update to determine whether the asset is enabled for the client device.

14. A method for managing a software update for a client device coupled to a network, comprising:
receiving, by a first server device coupled to the network, an asset request from the client device for an asset, the asset request including a cryptographic identifier of the client device;
in response to receiving the asset request, verifying the client device based, at least in part, on the cryptographic identifier of the client device; and
upon to verifying the client device, providing agreed response signed by the first server device to the client device, the signed response including a storage location for the asset, wherein
the asset is registered with the first server device by a second server device, the registration including a signed receipt and a storage location for the asset.

15. The method of claim 14, wherein the storage location for the asset is a randomized storage location on a content server.

16. The method of claim 14, wherein the cryptographic identifier comprises:
one or more hardware keys that are derived from or stored within secure memory of the client device.

17. The method of claim 16, wherein verifying the client device based, at least in part, on the cryptographic identifier of the client device comprises:
verifying the one or more hardware keys using a cryptographic technique.

18. The method of claim 14, further comprising:
including, in the signed response, the signed receipt for the asset.

19. The method of claim 18, further comprising:
authenticating, by the client device, the signed receipt for prior to retrieving the asset.

20. A non-transitory, computer-readable storage medium having stored thereon instructions, which, when executed by one or more processors of a first server device coupled to a network, causes the one or more processors to perform operations for managing a software update for a client device coupled to the network, the operations comprising:
receiving an asset request from the client device for an asset, the asset request including a cryptographic identifier of the client device;
in response to receiving the asset request, verifying the client device based, at least in part, on the cryptographic identifier of the client device; and
upon verifying the client device, providing a response signed by the first server device to the client device, the signed response including a storage location for the asset wherein
the asset is registered with the first server device by a second server device, the registration including a signed receipt and the storage location for the asset.

21. The non-transitory, computer-readable storage medium of claim 20, wherein the cryptographic identifier comprises:
one or more hardware keys that are derived from or stored within secure memory of the client device.

22. The non-transitory, computer-readable storage medium of claim 21, wherein verifying the client device based, at least in part, on the cryptographic identifier of the client device comprises:
verifying the one or more hardware keys using a cryptographic technique.

23. The non-transitory, computer-readable storage medium of claim 20, wherein the signed response includes the signed receipt for the asset.

24. The non-transitory, computer-readable storage medium of claim 23, wherein the signed receipt is authenticated by the client device prior to retrieving the asset.

\* \* \* \* \*

UNITED STATES PATENT AND TRADEMARK OFFICE
CERTIFICATE OF CORRECTION

PATENT NO.        : 11,144,297 B2                                              Page 1 of 1
APPLICATION NO.   : 16/147295
DATED             : October 12, 2021
INVENTOR(S)       : De Atley et al.

It is certified that error appears in the above-identified patent and that said Letters Patent is hereby corrected as shown below:

In the Claims

Claim 1, Column 18, Line 7, delete "upon to verification" and insert --upon verification--

Claim 14, Column 19, Lines 16-17, delete "upon to verifying the client device, providing agreed response signed" and insert --upon verifying the client device, providing a response signed--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*